United States Patent
McKenney

(10) Patent No.: US 6,668,310 B2
(45) Date of Patent: Dec. 23, 2003

(54) HIGH SPEED COUNTERS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 09/850,938

(22) Filed: May 7, 2001

(65) Prior Publication Data

US 2002/0166030 A1 Nov. 7, 2002

(51) Int. Cl.[7] ............................................. G06F 12/00
(52) U.S. Cl. ....................... 711/147; 711/147; 711/148; 711/144; 711/145; 711/154; 713/502
(58) Field of Search ................................. 711/147, 148, 711/144, 145, 154; 713/502

(56) References Cited

U.S. PATENT DOCUMENTS

| | | | | |
|---|---|---|---|---|
| 5,911,065 A | * | 6/1999 | Williams et al. | 709/107 |
| 5,926,829 A | * | 7/1999 | Hagersten et al. | 711/120 |
| 6,035,377 A | * | 3/2000 | James et al. | 711/147 |
| 6,347,362 B1 | * | 2/2002 | Schoinas et al. | 711/147 |
| 6,397,306 B2 | * | 5/2002 | Ciavaglia et al. | 711/148 |

OTHER PUBLICATIONS

R. Biro et al., net/ipv4/af_inet.c, Linux Open Source Kernel, vers.: $Id: tcp.c, v Nov. 28, 2000, 17:04:09 davem Exp $.

A. Cox, include/net/snmp.h, Linux Open Source Kernel, vers.: $Id: snmp.h,v 1.17, Sep. 21, 2000, 01:31:50 davem Exp $.

R. Biro et al., net/ipv4/tcp.c, Linux Open Source Kernel, vers.: $Id: af_inet.c, v 1.127, Dec. 22, 2000, 19:51:50 davem Exp $.

* cited by examiner

*Primary Examiner*—Donald Sparks
*Assistant Examiner*—Ngoc V Dinh
(74) *Attorney, Agent, or Firm*—Lieberman & Brandsdorfer, LLC

(57) ABSTRACT

Implementing distributed reference counters in a multiprocessor computer ensures a fair allocation of memory to each of the CPUs and quads in the system. The distributed reference counter tracks the limits of the value in each CPU, each quad, a global value and the maximum cache count allowed while mitigating a cache overflow error. The cache count is dynamically varied based upon a desired level of cache value in a node and a CPU. By modifying the fields of the data structure of the distributed reference counter to accept 64 bit integers, both the cache and target values of the data structure may be combined into one 64 bit integer. The upper 32 bits represent the cache value and the lower 32 bits represent the target value. This modified data structure now allows for both the target and cache values to be atomically manipulated as a single quantity, thereby reducing the possibility of a cache overflow situation.

19 Claims, 12 Drawing Sheets

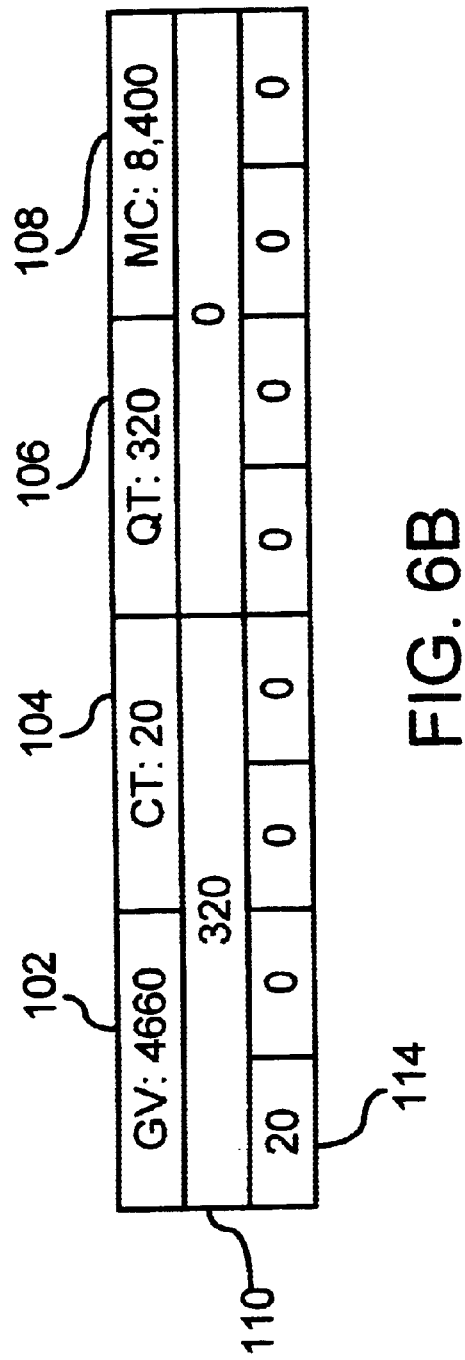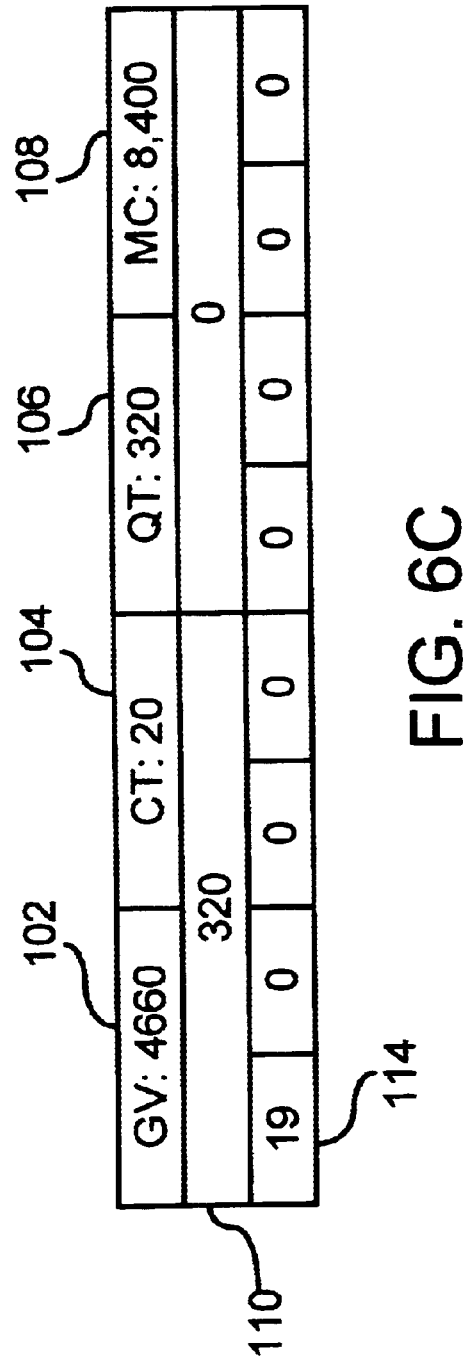

| 102 | 104 | 106 | 108 |
|---|---|---|---|
| GV: 4660 | CT: 20 | QT: 320 | MC: 8,400 |
| 337 | 0 | 0 | 0 |
| 0 | 0 | 0 | 0 |
| 24 | 0 | 0 | 0 |

FIG. 6F

| 102 | 104 | 106 | 108 |
|---|---|---|---|
| GV: 4316 | CT: 20 | QT: 320 | MC: 8,400 |
| 337 | 0 | 320 | 0 |
| 0 | 0 | 0 | 0 |
| 24 | 0 | 0 | 20 |

FIG. 6G

HIGH SPEED COUNTERS

BACKGROUND OF THE INVENTION

1. Technical Field

This invention relates to memory allocation in a computer system. More specifically, this invention relates to memory allocation in the environment of a shared memory multiprocessor computer system.

2. Description of the Prior Art

Multiprocessor systems by definition contain multiple processors, also referred to herein as CPUs that can execute multiple processes or multiple threads within a single process simultaneously in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

The use of NUMA architecture to increase performance is not restricted to NUMA machines. A subset of processors in an UMA machine may share a cache. In such an arrangement, even though he memory is equidistant from all processors, data can circulate among the cache-sharing processors faster (i.e. with lower latency) than among the other processors in the machine. Algorithms that enhance the performance of NUMA machines can thus be applied to any multiprocessor system that has a subset of processors with lower latencies. These include not only the noted NUMA and shared-cache machines, but also machines where multiple processors share a set of bus-interface logic as well as machines with interconnects that "fan out" (typically in hierarchical fashion) to the processors.

Multiprocessor computers with distributed shared memory are often organized into multiple nodes with one or more processors per node. The nodes interface with each other through a memory interconnect network by using a protocol.

In a NUMA machine, the memory is physically closer to a processor on the same node than a processor on another node. Consequently, processes run faster if their memory is placed on the node containing the processor running that process since the processor and memory would not need to communicate between nodes. In contrast, in a UMA machine the memory is substantially equidistant from all processors, and there is no performance advantage to placing a process's memory in any particular range of physical addresses.

In a multiprocessor computing environment it is often necessary to provide a system for preventing any given type of structure from consuming all of the memory. This system requires that a count of the number of structures allocated be maintained to ensure that the value of the cache in each CPU is maintained within a predetermined range. Distributed reference counters have been implemented in the prior art multiprocessor computer systems to address the issue of cache overflow and cache underflow. The distributed reference counters are used to track cache memory accesses by each CPU and each quad to make sure a cache overflow situation does not occur. FIG. 3 is a diagram of the data structure 50 of the prior art distributed reference counter. As shown in FIG. 3, the first field 52 is divided into three sections 54, 56 and 58. The first section 54 is a lock for the data structure, the second section 56 is the identifier of the CPU corresponding to the data structure, and the third section 58 is the identifier of the quad corresponding to the data structure. The second and third fields, 60 and 62, respectively, of the distributed reference counter store cache value and target value at a specific CPU. The target value is the desired value of cache. The remaining fields of the prior art distributed reference counter pertain to the number of increments per CPU 64, number of decrements per CPU 66, the number of increments per quad 68, and the number of decrements per quad 70. Each of the fields in the data structure have a cache size of 32 bits. Accordingly, the prior art reference counter contains separate fields for cache value and target value per CPU and per quad.

In conjunction with the reference counter, the prior art system includes a primitive for either increasing or decreasing the reference counter. The following is the per-CPU fastpath pseudocode for decrementing the reference counter of the prior art (pointed to by the argument "rep") by a specified amount and is used when the per-CPU cache has enough value to cover the amount of the decrement:

1. If the per engine counter structure referenced by a pointer to the current CPU's value-cache structure belongs to some other CPU, invoke a function to handoff to an appropriate quad.
2. Atomically increment a count of the number of decrements.
3. If the value to be decremented by is too large, invoke the refcnt_decr_eng_large( ) to perform the decrement to avoid arithmetic overflow.
4. Select the field named rcp_value from the structure pointed to by pointer rep and copy to local variable "snapshot", and select the field named rcp_target from the structure pointed to by pointer rep and copy to local variable "snaptgt".
5. If "snapshot" is at least as large as the amount to be decremented by:
   a) Atomically compare the value cache at this CPU with "snapshot", and (if they are equal) exchange with the quantity "snapshot-value".
   b) If the compare and exchange operation in step (5a) succeeds, return REFCNT—NONZERO to indicate that the aggregate value of the reference counter is greater than zero, otherwise continue with step 6.
6. If we reach this point, the fastpath for decrementing the reference counter failed, and conventional locking with interrupts disabled to complete the update should be invoked.

The following is the per-CPU fastpath pseudocode for incrementing the reference counter of the prior art by a specified amount:

1. If the per engine counter structure referenced by a pointer to the current CPU's value-cache structure belongs to some other CPU, invoke a primitive handoff to an appropriate quad.
2. Atomically increment the field named "nincrs" from the structure pointed to by the pointer rep to count the increment.
3. There is no race-free fastpath for incrementing the reference counter, so conventional locking methods are used to complete the update.

Both the increment and decrement primitives of the prior art allocate 32 bit integers for both the value and target fields of the data structure. The value and target fields are separate fields within the structure and as such must be independently manipulated. When an increment of the counter takes place, a comparison and exchange of the cache and target values need to occur in a single operation in order to maintain accuracy. Although both the cache and target values may be stored in a single field of the data structure as 32 bit integers with the cache and target values limited to 16 bits each, the limits associated with storing such data in a 16 bit integer can result in overflow problems. Accordingly, there is a need for a distributed reference counter in which the cache values and the target values may be simultaneously modified as an atomic action.

SUMMARY OF THE INVENTION

It is therefore an object of the invention to provide a method for tracking a quantity of memory elements in a multiprocessor computer system. It is a further object of the invention to provide a distributed reference counter that combines the cache value and the target value into a single quantity to provide an efficient and accurate system for mitigating cache overflow.

A first aspect of the invention is a method of tracking a quantity of memory elements in a multiprocessor. The cache value and the target value are combined into a single quantity. Both the cache and target values are atomically manipulated as a single quantity. Furthermore, the target value of each CPU and each node is maintained and dynamically varied based upon the distance between the total value and the value limits.

A second aspect of the invention is a reference counter for use in a multiprocessor computer system including a single quantity for storing a cache value and a target value, and an instruction for controlling the quantity. The cache value and the target value are atomically manipulated by the instruction as a single quantity. In addition, the reference counter includes a cache manager to dynamically vary the desired level of cache in each CPU and node based upon the distance between a total value and the cache limits of the distributed reference counter.

A third aspect of the invention is an article comprising a computer-readable signal bearing medium, with multiple processors operating in the medium. The article includes combining a cache value and a target value into a single quantity and a means for atomically manipulating the quantity. In addition, the article includes a cache manager to dynamically vary a desired level of value in a node and a CPU based upon the distance between a total value and value limits.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Incorporating a distributed reference counter into a multiprocessor computing environment prevents any given structure in the system from consuming all of the memory. The reference counter has several uses, including managing the allocation of memory, counting the number of outstanding I/Os to a physical disk or logical volume, and throttling TCP packets sent to a LAN interface in order to avoid internal congestion. It is not necessary that the counter compute an exact count of memory allocation at any given time, rather that the counter determine that the per-CPU caches be maintained within a predetermined range so as not to encounter a cache overflow or underflow situation. The distributed reference counter is highly parallel and allows other CPUs in the system to manipulate cache values at any time. The algorithm incorporated into the distributed reference counter allows for other CPUs in the system to manipulate the current CPU's target value by either increasing or decreasing the value. In addition, the distributed reference counter allows for the same CPU to be interrupted, and have the interrupt handler code invoke an algorithm for either increasing or decreasing the reference counter by a specified amount.

Technical Background

Figure 1:
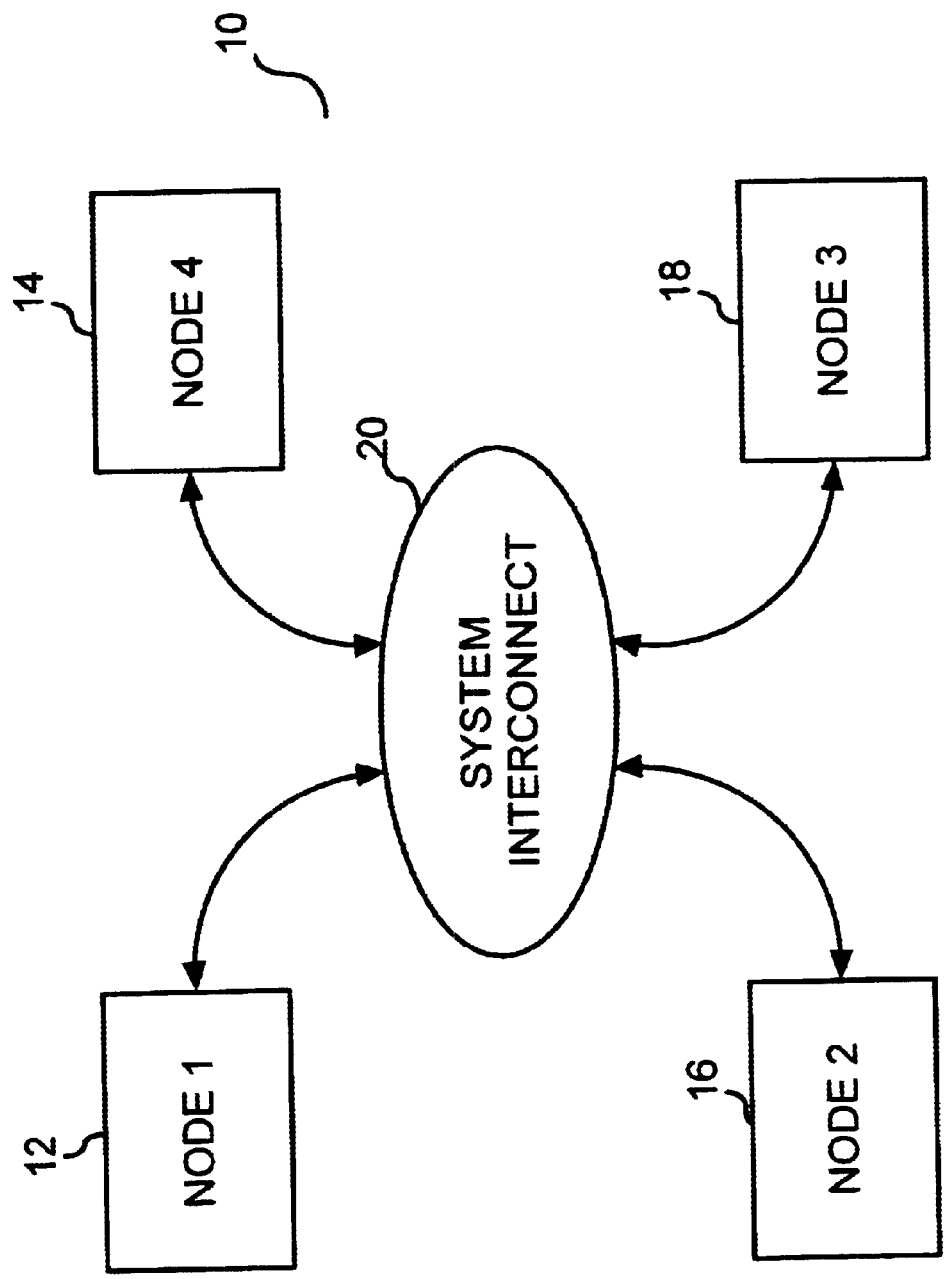
FIG. 1 is a block diagram of a prior art multinode multiprocessor computer system with a system interconnect coupling the nodes together.

As illustrated in FIG. 1 a multiprocessor system 10 may include multiple nodes. The system 10 uses a Distributed shared Memory (DSM) architecture, which may or may not be a Non-Uniform Memory Access machine (NUMA). As shown in FIG. 1, there are four nodes 12, 14, 16 and 18 that are each connected by a system interconnect 20 that permits any node to communicate with any other node in the system. The purpose of the system interconnect 20 is to allow processors in any node to access the memory resident in any other node in the system. The physical links of system interconnect 20 provide high bandwidth and low latency and are scalable to allow for the addition of more nodes in the system 10. Accordingly, the multiprocessor system 10 is an illustration of the connection of each of the nodes for allowing shared memory access.

Figure 2:
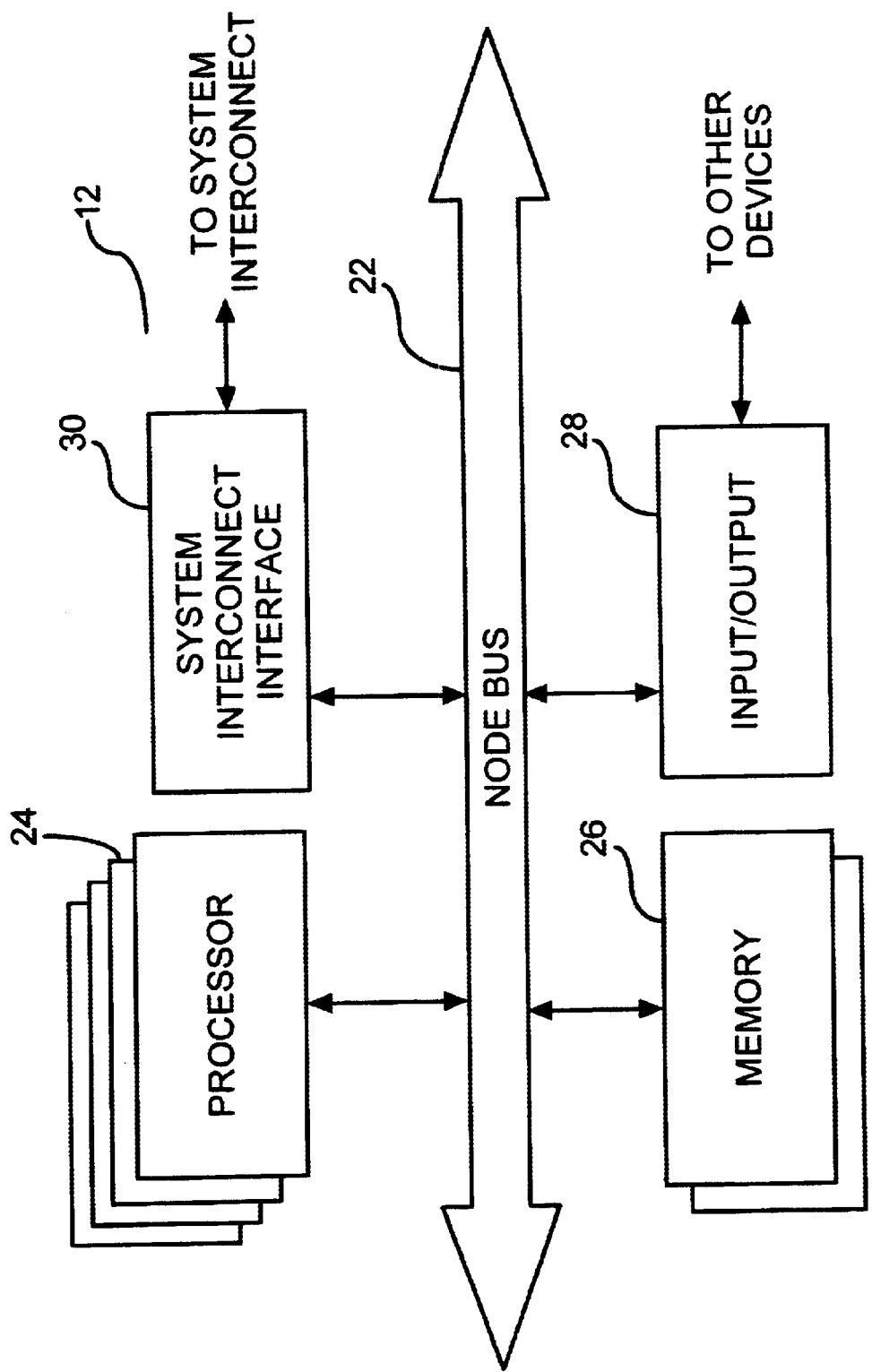
FIG. 2 is a prior art block diagram of one of the nodes of the computer system of FIG. 1.

FIG. 2 is a block diagram of node 12 on system 10. The node 12 includes a conventional symmetrical multiprocessor (SMP) node bus 22 for connecting multiple data processors 24 to local memory. A node constructed with four processors is referred to as a quad. Each of the nodes 12, 14, 16 and 18 may be referred to as home nodes or remote nodes. A home node is a node in which the address of the memory block falls within the address range supported by the local memory or cache, and a remote node is a node in which the memory block is not within the address range supported by local memory or cache. In addition, a node may be a requesting node or a responding node. A requesting node is a node requesting data, and responding node is a node providing data. Accordingly, each node in the system includes memory which may be locally or remotely accessed by each other node in the system.

Figure 3:
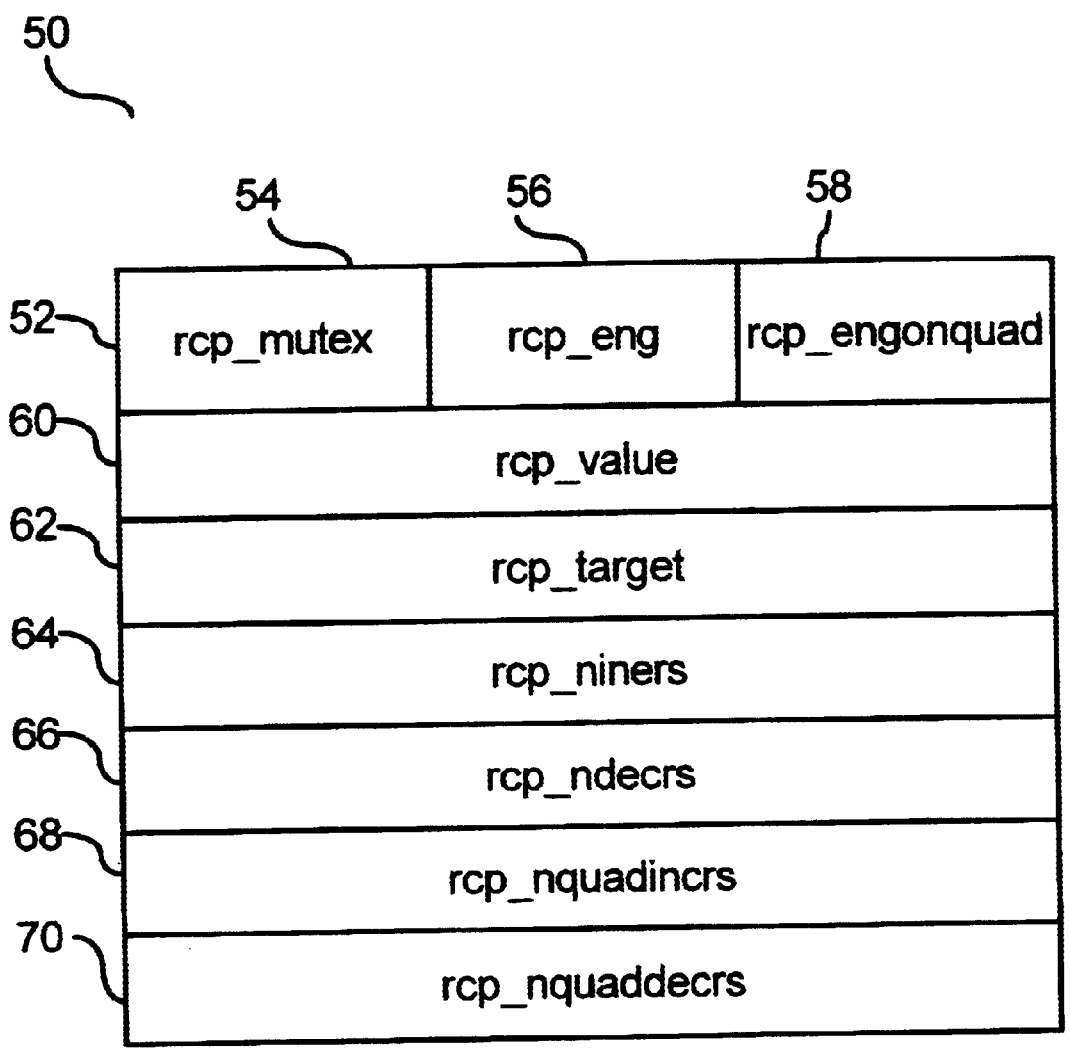
FIG. 3 is a prior art diagram of a data structure of a distributed reference counter.
Figure 4:
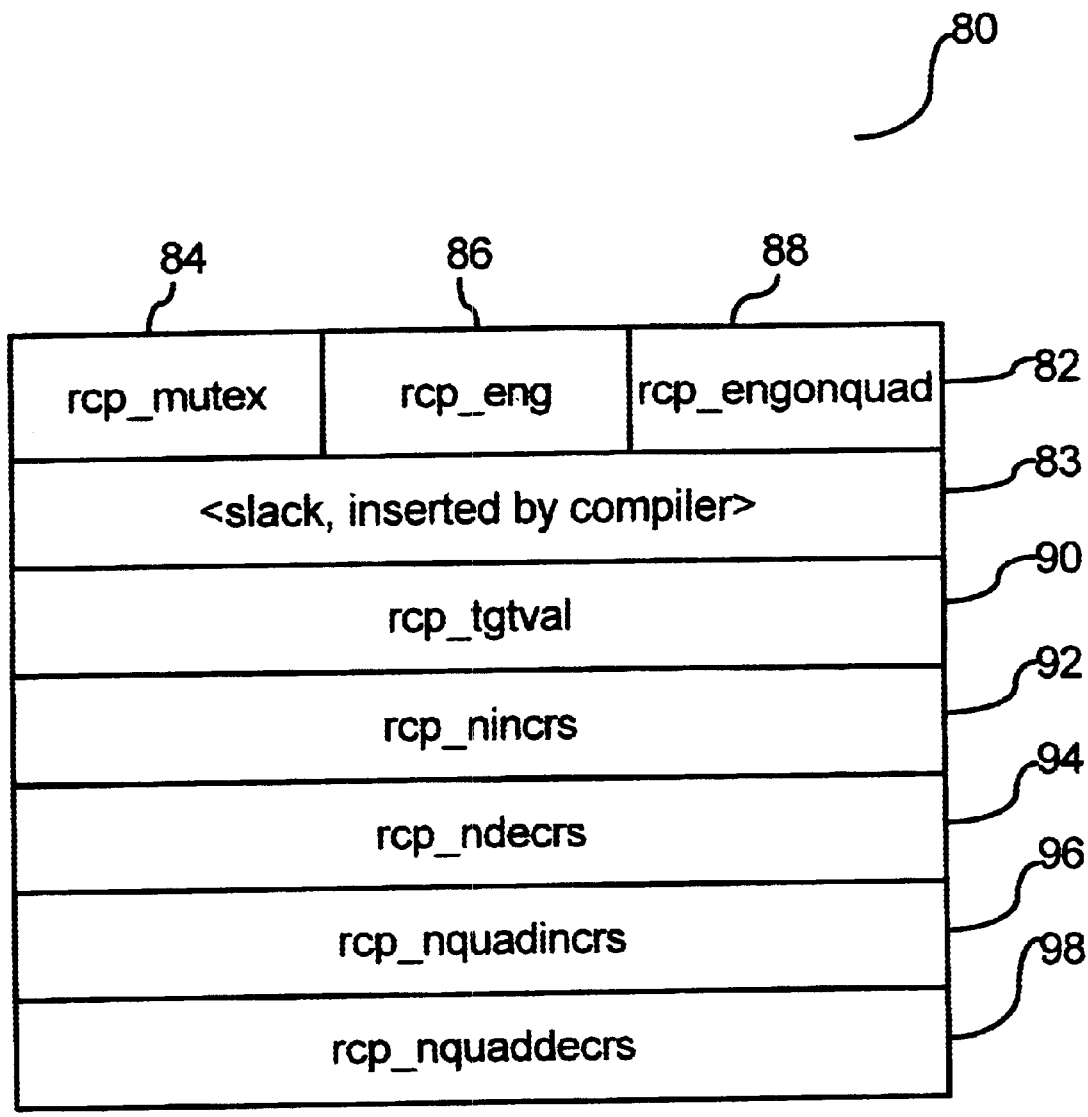
FIG. 4 is a diagram of a data structure of the distributed reference counter according to the preferred embodiment of this invention, and is suggested for printing on the first page of the issued patent.

FIG. 4 is a diagram of the data structure 80 of the distributed reference counter of the preferred embodiment of the invention. Each of the fields in the data structure have a cache size of 64 bits. As shown in FIG. 4, the first field 82 is divided into three sections 84, 86 and 88, similar to 54, 56 and 58 of FIG. 3. The first section 84 is a lock for the data structure, the second section 86 is an array of per-CPU distributed referenced counter structures which hold value cache for the corresponding CPU, and the third section 88 is an array of per quad structures which serve as a cache for the corresponding quad. The second field 83 provides for slack and is inserted by the compiler. The third field 90 of the distributed reference counter stores both cache value and target value at a specific CPU. The upper 32 bits of the integer contain the target value and the lower 32 bits of the integer contain the cache value. The remaining fields of the distributed reference counter of the preferred embodiment pertain to the number of increments per CPU 92, number of decrements per CPU 94, the number of increments per quad 96 and the number of decrements per quad 98. Accordingly, the cache value and the target value are each 32 bit integers stored in a single 64 bit integer in one field of the data structure.

In conjunction with the reference counter, the system of the preferred embodiment includes a primitive for either increasing or decreasing the reference counter. The following is the per-CPU fastpath pseudocode for decrementing the reference counter of the preferred embodiment (pointed to by the argument "rep") by a specified amount and is used when the per-CPU cache has enough value to cover the amount of the decrement:

1. If the per engine counter structure referenced by a pointer to the current CPU's value-cache structure belongs to some other CPU, invoke a function to handoff to an appropriate quad.
2. Atomically increment a count of the number of decrements.
3. If the value to be decremented by is too large, invoke the refcnt_decr_eng_large( ) to perform the decrement to avoid arithmetic overflow.
4. Select the field named "rcp_ndecrs" from the structure pointed to by pointer rep and copy to a local variable "tgtval".
5. Copy the lower 32 bits of "tgtval" to local variable "snapshot" and the upper 32 bits of "tgtval" to "snaptgt".
6. If "snapshot" is at least as large as the amount to be decremented by:
   a) Atomically compare the tgtval (value cache and the target value) at this CPU with "(snaptgt<<32)+ snapshot" and (if they are equal) exchange with the quantity "(snaptgt<<32)+snapshot+value".
   b) If the compare and exchange operation in step (6a) succeeds, return REFCNT_NONZERO to indicate that the aggregate value of the reference counter is greater than zero, otherwise continue with step 7.
7. If we reach this point, the fastpath for decrementing the reference counter failed, and conventional locking with interrupts disabled to complete the update should be invoked.

Accordingly, in the event the decrement primitive fails, the conventional locking with interrupts disabled prevents races to ensure that only this CPU can update this CPU's per engine counter structure.

The following is the pseudocode for incrementing the reference counter of the preferred embodiment (pointed to by the argument "rep") by a specified amount:

1. If the per engine counter structure referenced by a pointer to the current CPU's value-cache structure belongs to some other CPU, invoke a function to handoff to an appropriate quad.
2. Atomically increment the field named "nincrs" from the structure pointed to by the pointer rep to count the increment.
3. If the value to be incremented by is too large, invoke the refcnt_decr_eng_large( ) to perform the decrement and to avoid arithmetic overflow.
4. Copy the lower 32 bits of "tgtval" to local variable "snapshot" and the upper 32 bits of "tgtval" to "snaptgt".
5. If "snapshot+value" is less than or equal to "2*snaptgt":
   a) Atomically compare the tgtval (value cache and the target value) at this CPU with "(snaptgt<<32)+ snapshot" and if they are equal exchange with the quantity "(snaptgt<<32)+snapshot+value".
   b) Return REFCNT_NORM to indicate that the aggregate value of the reference counter is in range.
6. If we reach this point, the fastpath for incrementing the reference counter failed, and conventional locking with interrupts disabled to complete the update should be invoked.

The preferred embodiment combines the cache value and the target value into one 64 bit integer. The upper 32 bits comprises the cache value and the lower 32 bits comprises the target value. The purpose of the snapshot as illustrated in the pseudocode is to provide a comparison with a known value. The snapshot provides a local variable at a known time and provides a computation with a known value. If another CPU changes the value at the time of the exchange, then the associated compare and exchange instruction will return a FAIL and will use a conventional locking primitive.

Figures 5, 6A:
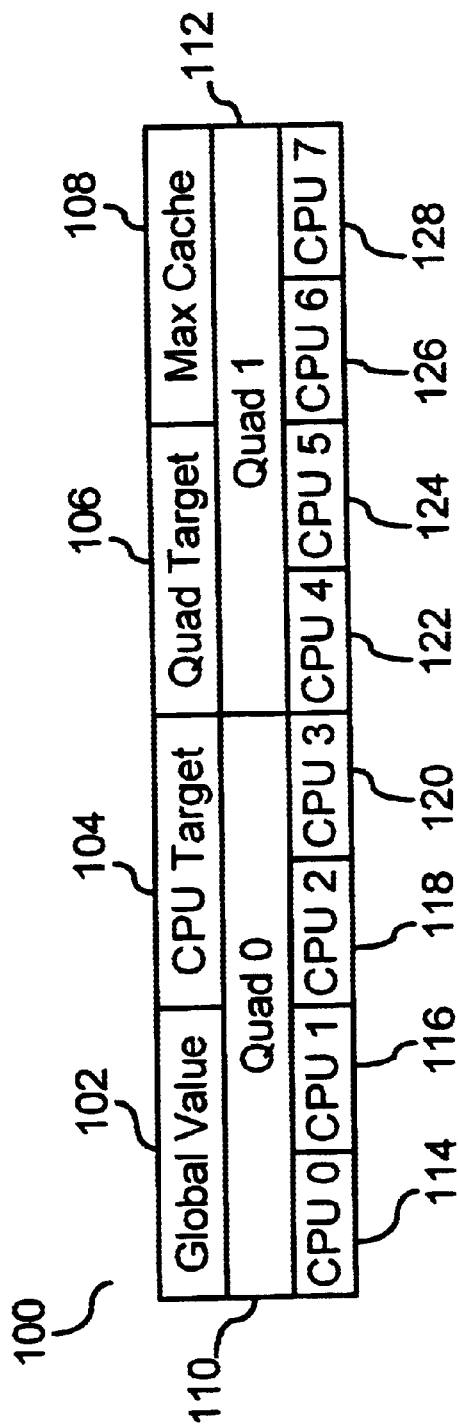
FIG. 5 is a diagram illustrating a distributed reference counter.
FIGS. 6a–n are block diagrams demonstrating the embodiments of the distributed reference counter.

In addition to storing the cache and target values in a single 64 bit integer, the distributed reference counter of the preferred embodiment dynamically varies the available cache in the system in each CPU and each quad, and maintains a global counter for all the cache distributed in the system. The following is an illustrative example of the implementation of the distributed reference counter of the preferred embodiment. FIG. 5 is a diagram of the distributed reference counter data structure 100. In this example, the system is comprised of two quads, with each quad containing four CPUs. The top section of the diagram contains the global value 102, the CPU target 104, the quad target 106, and the maximum cache 108. The global value 102 is a 64 bit integer that represents that part of the total value that has not been allocated to the per-CPU or per-quad caches. The CPU Target 104 is the cache value that the algorithm attempts to hold for each CPU. The quad target 106 is the cache value that the algorithm attempts to hold for each quad, and is limited to be no more than four times the number of CPUs on the quad times the per-CPU target value. The Max Cache value 108 is the value above which the global value must be exact. The total value of the reference counter is obtained by summing up the global value 102, all of the per quad cache values 110 and 112, and all of the per-CPU caches 114–128. In the example illustrated in FIG. 6B, the CPU target value is limited to be no more than 20, and the quad target limit will be 320 by default. The actual cache value may range from zero to twice the corresponding target values. The value cache at each CPU may vary from zero to 40 and the value cache at each quad may range from 0 to 640 if the targets are at their default maximums. Accordingly, the total cache value of 3,200 is required to support the maximum cache among the quads and CPUs of the system illustrated herein.

In general, the reference counter operates at its greatest efficiency in the middle of the caching range. In the example herein, the caching range is set at 10,000, as shown in FIG. 6a. Therefore, the reference counter is set to 5,000 to place it in the middle of the caching range, as is reflected in FIG. 6b. In addition, the maximum cache is decreased to allow it to compare directly to the global value, as is reflected at 108 with the value of 8,400, which is half of the total value required to support the maximum cache value of each CPU and quad. The decreasing of the maximum cache limits allows it to be compared directly to the global value. If the global value exceeds 8,400, it will be necessary to reduce the target values so that overflow can be reliably detected. In addition to incrementing the reference counter to 5,000 in FIG. 6b, a cache value of 320 has been parceled out to quad 0 at 110 and a cache value of 20 has been parceled out to CPU 0 at 114. Accordingly, the global value 102 has been decreased to reflect the parceling.

Figure 6D:
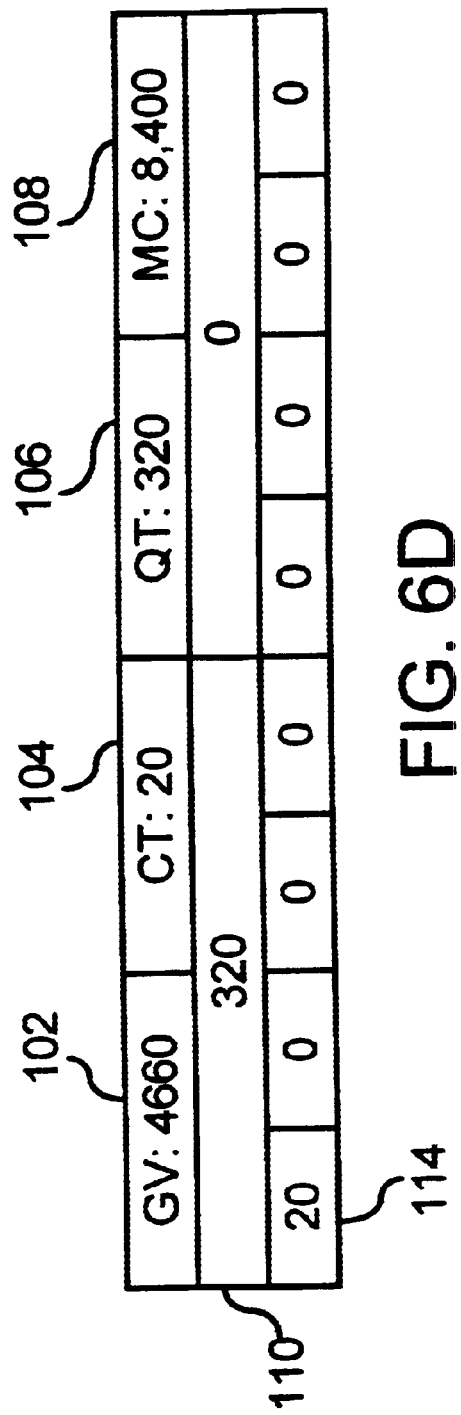
Figure 6E:
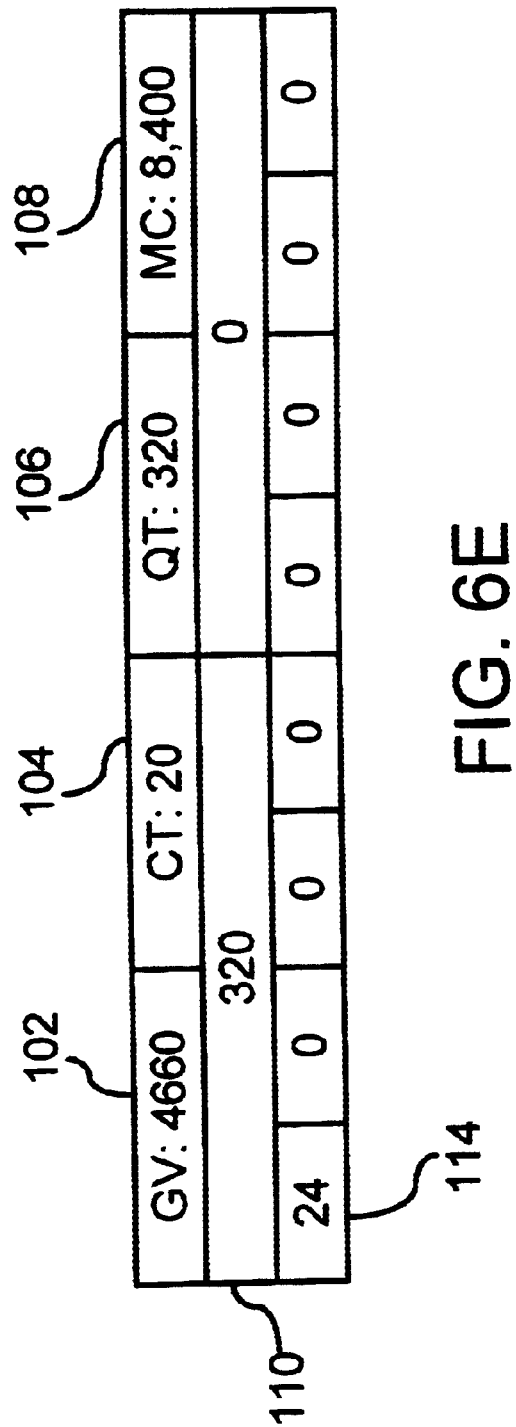
Figure 6H:
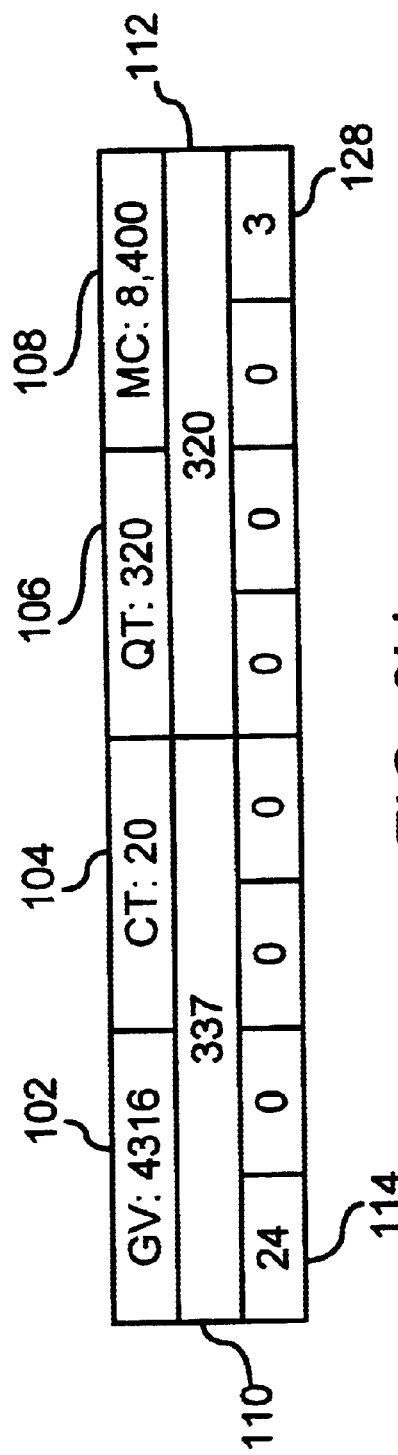

In FIG. 6c, the reference counter is decreased by a count of 1. This only requires a local action on the CPU 0 portion of the data structure. Since the memory representing this portion is homed on quad 0, no remote references are necessary. In FIG. 6d, the referenced counter is increased by a count of 1. This only requires a local action on the CPU 0 portion of the data structure. In FIG. 6e, the referenced counter is increased by a count of 4, which also only requires a local action. However, FIG. 6f demonstrates the reference counter being increased by a count of 17. This quantity requires accessing the quad level of the data structure. The value of 17 is added directly to the quad value, as shown at 110. Since the CPU value is near the middle of the allowable range, it remains constant. FIG. 6g demonstrates the reference counter being decreased by 4 on CPU 7. Since the CPU 128 and the quad levels 112 are both empty, this step requires that the cache be accessed from the global level. At the same time, a count of 20 is placed in local CPU 7 and a count of 320 is placed in quad 1. The global value is decreased by a count of 344 to reflect the allocation of cache counts. FIG. 6h demonstrates the reference counter being decreased by 17 on CPU 7. Since the counts are available in CPU 7, this only requires a local reference to the CPU and does not require accessing the quad level or the global value. Accordingly, FIGS. 6b–6h demonstrate how the counter first accesses cache counts on the local level prior to accessing counts from the global value.

Figure 6I:
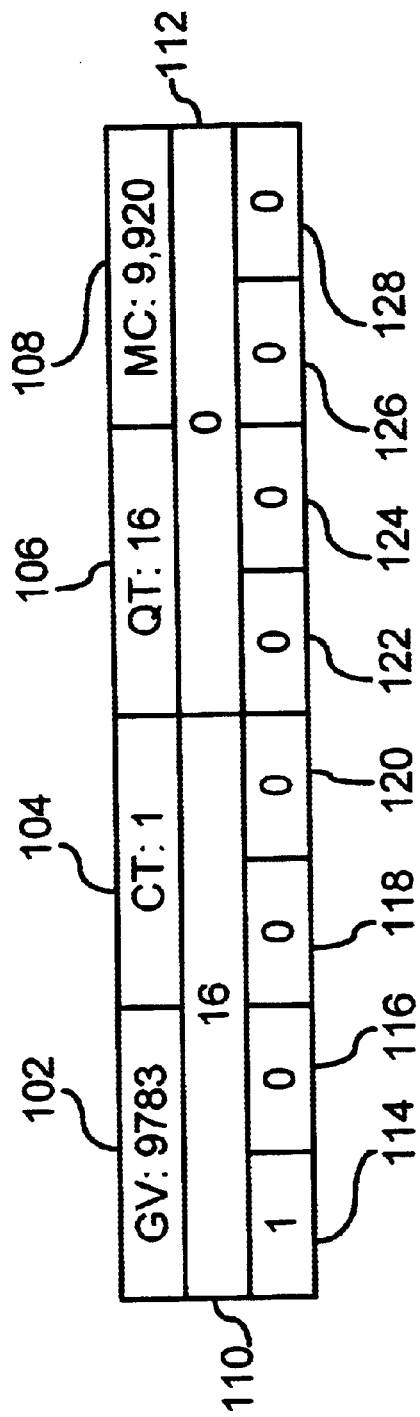
Figure 6J:
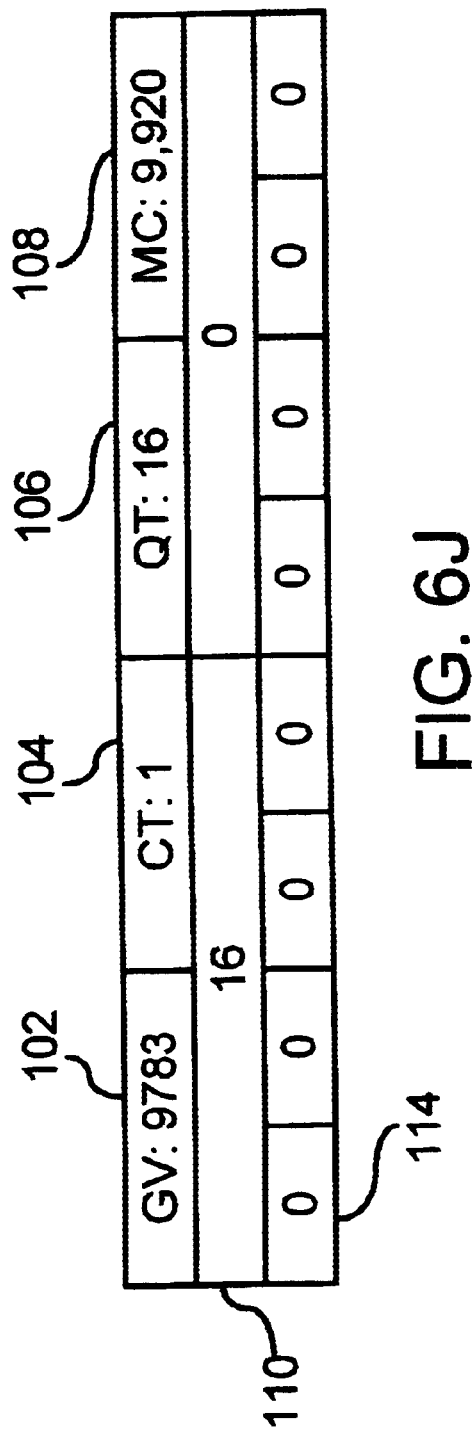
Figure 6K:
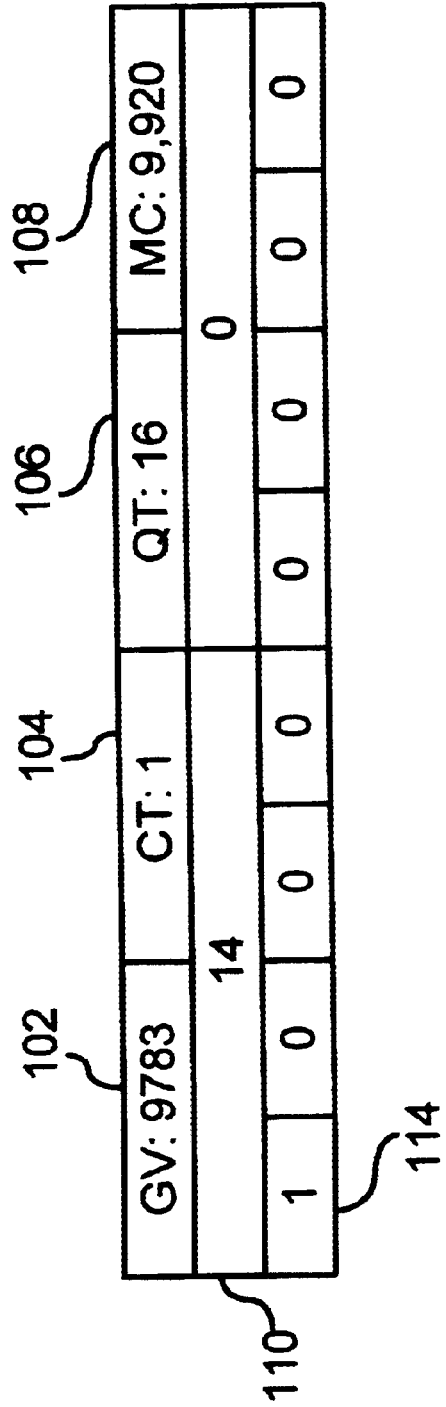
Figure 6L:
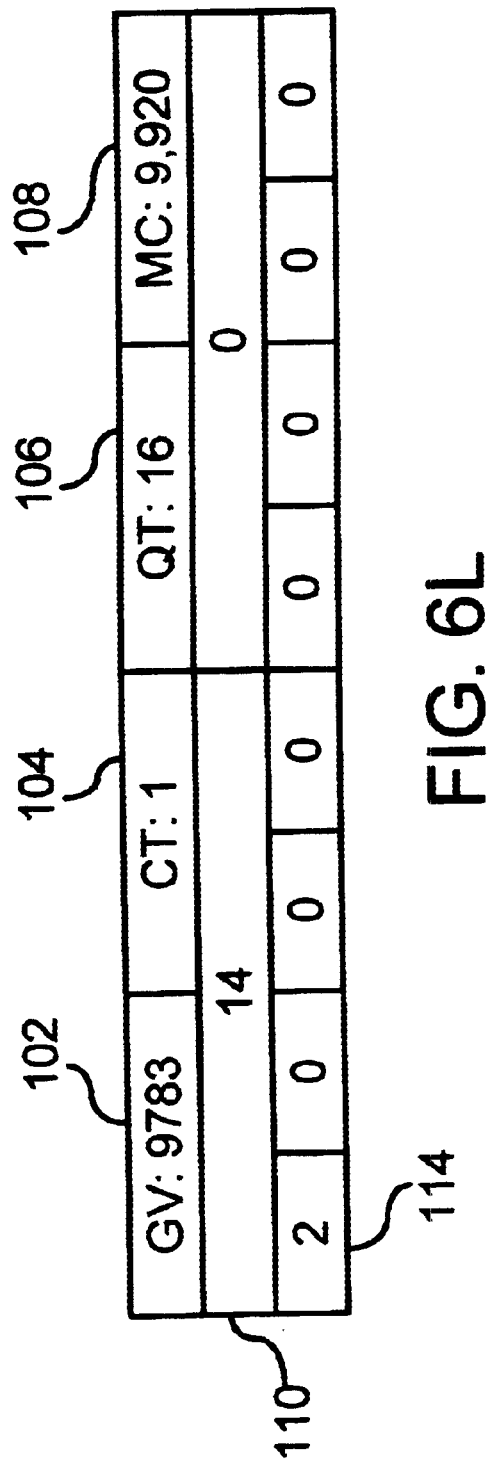
Figure 6M:
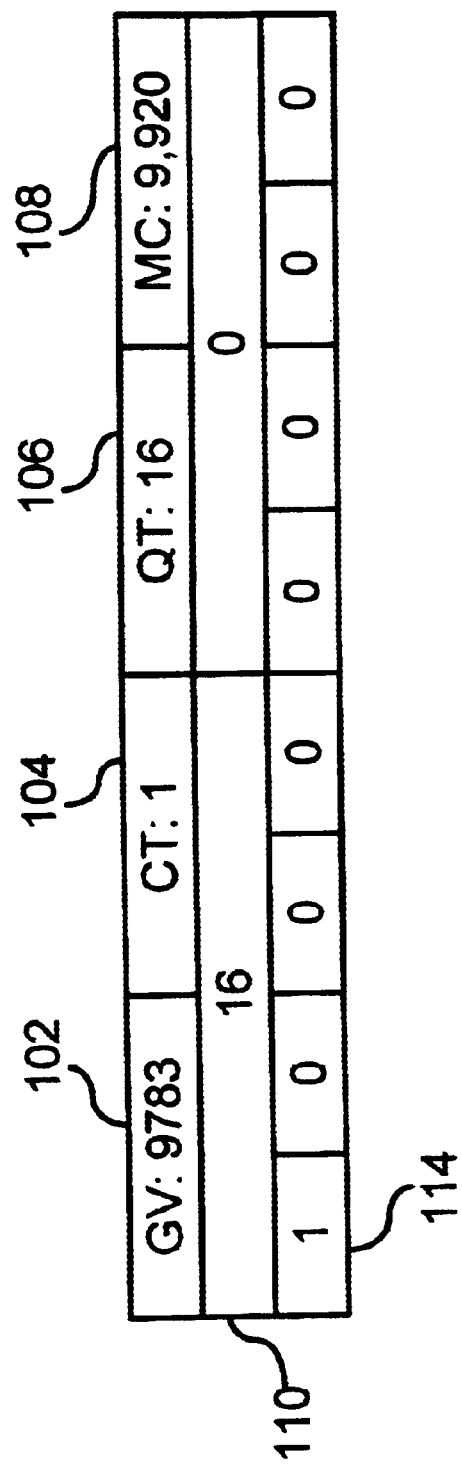

FIG. 6i demonstrates the reference counter being increased by 4,800 counts on CPU 0. This increment causes the global value 102 to exceed the maximum cache value of 8,400. Therefore, all values are flushed from the per-quad 110 and per CPU caches 114–120, and the target values 104 are recalculated to be 1 for the per CPU caches and 16 for the per quad caches 106. FIG. 6j demonstrates a decrement in the count by 1. Since this is resident in CPU 0, this requires only a local reference, although any larger decrement would have required accessing the quad level. FIG. 6k demonstrates an increment in the count by 1. Since this is within the recalculated limits of the allowable cache, this operation can be confined to the CPU level. FIG. 6l demonstrates an increment in the count by 1. Since CPU 0 at 114 has not reached its maximum cache, this operation is resident as a local operation and field 114 is increased by a count of 1. FIG. 6m demonstrates an increment in the count by 1. Since CPU 0 has reached its maximum cache amount, the cache must be accessed at the quad level. In this example, the quad is increased by a count of two at 110 to reflect a redistribution of the cache counts to allow the structure to operate at a greater efficiency. Accordingly, the distributed reference counter is designed to dynamically redistribute the reference counts among the CPUs and quad to allow for more efficient operation of the system.

Figure 6N:
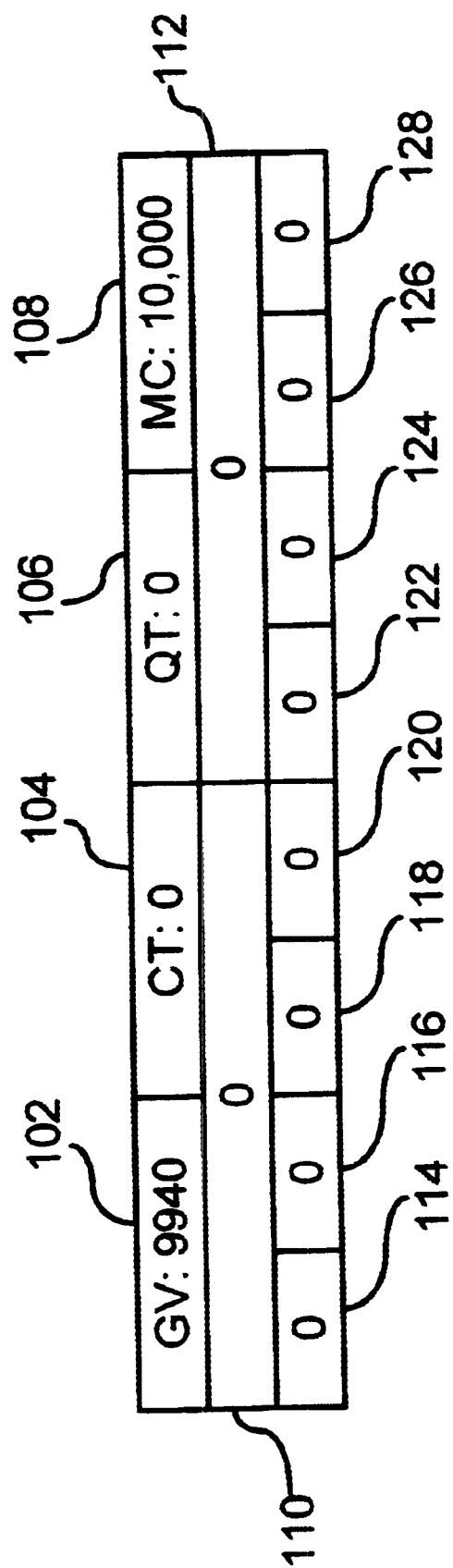

FIG. 6n is a continuation of the example shown in FIG. 6m. In this example, the reference counter is increased by a count of 140. However, this exceeds the maximum cache value and requires another redistribution of the system. Both the per-CPU values 114–128 and the quad values 110 and 112 are set to zero so that nothing can be placed therein, and a cache overflow situation can be avoided. Only the global value 102 can be incremented or decremented following this process. The global value 102 is set to reflect this redistribution of the cache counts. Any further increments to the counter must operate directly from the global value 102. Accordingly, as long as the total value remains in the range from 80 to 9920, the structure can operate locally.

As demonstrated in the example above, the reference counter tracks the limits of the value in each CPU, each quad, a global value, and the maximum cache count allowed without having a cache overflow error. The cache count is dynamically varied based upon a desired level of cache value in a node and a CPU. The changes in the cache count are based upon the distance between the total value and the value limits. Furthermore, as demonstrated in the above example, at such time as the total cache allotted per CPU and per quad are at the maximum value allowed, the counter is designed to access the global cache value. Accordingly, the counter has several safeguards to mitigate cache overflows scenario while also dynamically varying the cache limits of each CPU and quad in the system.

Advantages Over the Prior Art

The reference counter of the preferred embodiment combines the target and cache values into a single 64 bit integer. Each of the target values and cache values are limited to a size of 32 bits. In the prior art, each of the target and cache values were maintained in separate fields of the data structure and also had a size of 32 bits. However, the advantage of the preferred embodiment is the ability to maintain the size of both the cache and target values and to allow simultaneous atomic manipulation of this single integer. This mitigates error associated with calculations in the time interval associated with mathematic calculations of the target and cache values independently. The ability to atomically manipulate the target and cache values in combination with dynamically varying the desired level of value in a node in response to the distance between a total value and value limits reduces the possibility of a cache overflow situation. Accordingly, the advantage of the preferred embodiment is the ability to atomically manipulate a single integer containing both the target and cache values.

Alternative Embodiments

It will be appreciated that, although specific embodiments of the invention have been described herein for purposes of illustration, various modifications may be made without departing from the spirit and scope of the invention. In particular, the target and cache values could be combined into a single 32 bit integer with the target and cache values each being limited to a size of 16 bits. The system can be designed to function under similar circumstances with the target and cache values being atomically manipulated. Accordingly, the scope of protection of this invention is limited only by the following claims and their equivalents.

I claim:

1. A method for tacking a quantity of memory elements in a multiprocessor, comprising:

(a) combining a cache value and a target value into a single field of a data structure; and (b) atomically manipulating said field.

2. The method of claim 1, further comprising dynamically varying a desired level of value in a node and a CPU cache based upon distance between a total value and value limits.

3. The method of claim 2, further comprising accessing said total value when said cache value is outside of a predetermined range.

4. The method of claim 2, further comprising reducing said target value as said total value approaches a preset boundary.

5. The method of claim 1, wherein said field is a 64 bit binary integer.

6. A reference counter for use in a multiprocessor computer system, comprising:

a single field in a data structure for storing a cache value and a target value; and an instruction for controlling said field.

7. The reference counter of claim 6, wherein said cache value and said target value are atomically controlled.

8. The reference counter of claim 6, wherein said field is a 64 bit integer.

9. The reference counter of claim 6, further comprises a cache manager to dynamically vary a desired level of value in a node and a CPU cache based upon distance between a total value and value limits.

10. The reference counter of claim 9, wherein said cache manager accesses said total value when said cache value is outside of a predetermined range.

11. The reference counter of claim 9, wherein said manager reduces said target value as said total value approaches a preset boundary.

12. An article comprising:

a computer-readable medium having stored thereon computer executable instructions;

means in the medium for combining a cache value and a target value into a single field of a data structure; and means in the medium for atomically manipulating said field.

13. The article of claim 12, wherein said medium is selected from a group consisting of a recordable data storage medium and a modulated carrier signal.

14. The article of claim 12, further comprises a cache manager to dynamically vary a desired level of value in a node and a CPU cache based upon distance between a total value and value limits.

15. The article of claim 14, wherein said cache manager accesses said total value when said cache value is outside of a predetermined range.

16. The article of claim 14, wherein said cache manager reduces said target value as said total value approaches a preset boundary.

17. A method for tracking a quantity of memory elements in a multiprocessor, comprising:

(a) combining a cache value and a target value into a single field of a data structure;

(b) atomically manipulating said field; and (c) dynamically varying a desired level of value in a node and a CPU based upon distance between a total value and value limits.

18. The method of claim 17, further comprising accessing said total value when said cache value is outside of a predetermined range.

19. The method of claim 17, further comprising reducing said target value as said total value approaches a preset boundary.

* * * * *

UNITED STATES PATENT AND TRADEMARK OFFICE
CERTIFICATE OF CORRECTION

PATENT NO. : 6,668,310 B2
DATED : December 23, 2003
INVENTOR(S) : Paul E. McKenney It is certified that error appears in the above-identified patent and that said Letters Patent is hereby corrected as shown below:

<u>Title page,</u>
Item [54], Title, should read:
-- HIGH SPEED COUNTER FOR PREVENTING CACHE OVERFLOW --

Signed and Sealed this

Ninth Day of March, 2004

JON W. DUDAS
*Acting Director of the United States Patent and Trademark Office*